3,479,225
OXYGEN DEPOLARIZED ELECTROCHEMICAL MODULAR UNITS

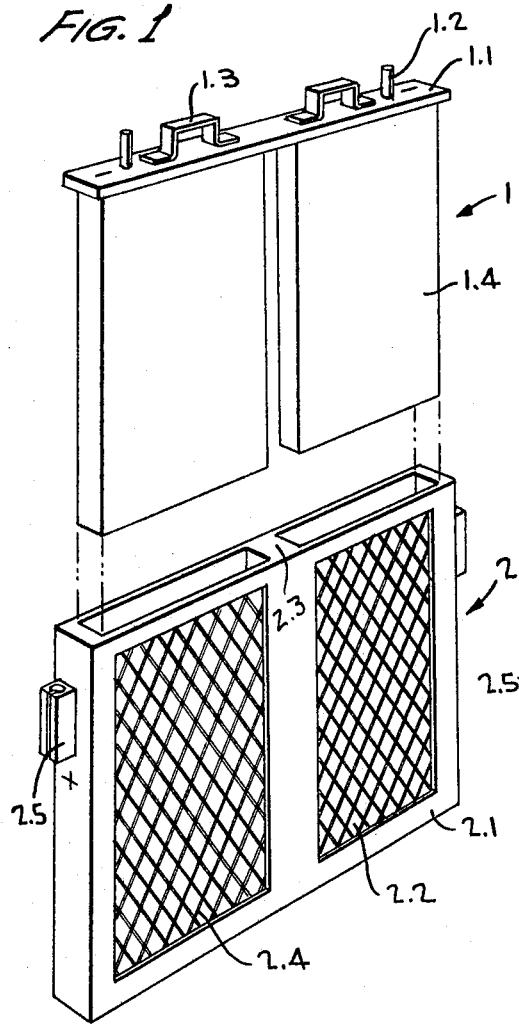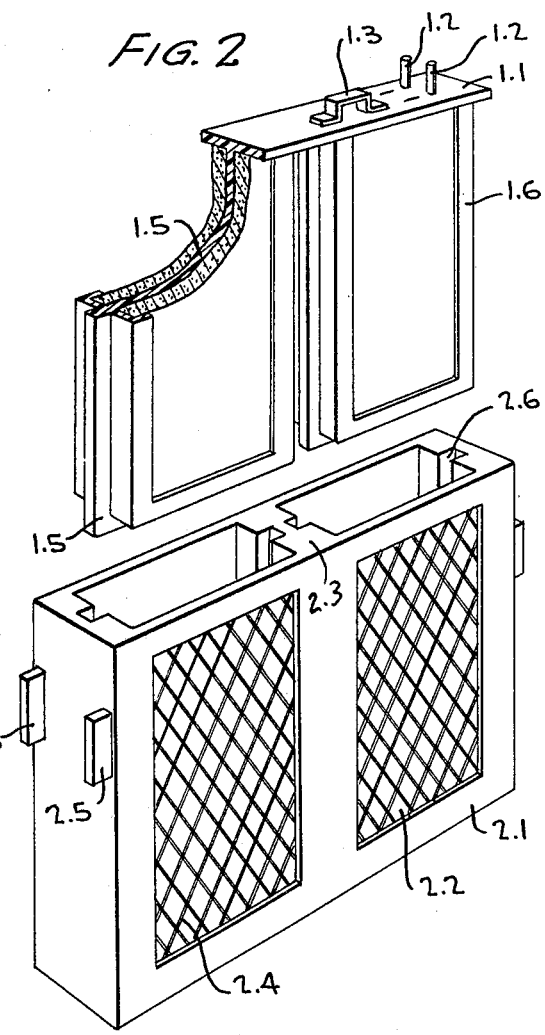
INVENTORS,
STEWART M. CHODOSH
EMANUEL G. KATSOULIS

Stewart M. Chodosh, Lake Success, and Emanuel G. Katsoulis, Long Island City, N.Y., assignors to Leesona Corporation, Warwick, R.I., a corporation of Massachusetts
Filed Mar. 15, 1966, Ser. No. 534,377
Int. Cl. H01m 27/04
U.S. Cl. 136—86                    10 Claims This invention embraces improved air or oxygen depolarized electrochemical units for the electrochemical generation of electrical current. More particularly, the invention is directed to an improved anode assembly for use in a battery of air or oxygen depolarized cells of the type described in commonly assigned Oswin application Ser. No. 427,623 filed Jan. 25, 1965, now abandoned, and Oswin and Chodosh application Ser. No. 517,603 filed Dec. 30, 1965. The improved anode assembly permits the construction of a battery of air or oxygen depolarized cells having replaceable anodes wherein the construction of the cell is simplified and wherein the anodes can be conveniently replaced once the metal anode has been consumed.

The metal/air and metal/oxygen electrochemical batteries described in the aforesaid Oswin and Oswin et al. copending applications permit a compact battery construction to provide a high energy to density ratio and have a rapid rate of discharge and charge. Moreover, since the anodes of the cells are replaceable, the batteries can be restored in the field, using a recharge kit, without need of an external DC power source. As a result of the aforesaid, the batteries are an excellent source of power for communication units and vehicles in field operation and in space systems.

The ability to obtain the high discharge-charge rate in the aforesaid batteries is primarily a result of the novel and highly efficient cathodes which comprise a hydrophobic polymer membrane, such as polytetrafluoroethylene, which is gas permeable but impermeable to liquids and a catalytic layer on one surface of the membrane which is in contact with the electrolyte of the cell. The anodes can be of any metal which is more electro-positive than oxygen. Preferred anodes are porous zinc and porous magnesium structures wrapped in a hydrophilic membrane such as fiber reinforced cellulose. The anode is positioned within the cathode and separated therefrom by means of an electrolyte. Preferably, the electrolyte is trapped in a suitable matrix such as the wrapping of the anode. Clamps are provided to hold the anode and cathode in operable association.

In operation, air or oxygen passes through the polymer membrane, ionizes at the catalytic layer, accepting electrons and forming hydroxyl ions which are transferred to the anode to complete the electrochemical reaction. A representative reaction where zinc is employed as the anode and the cell fed with oxygen is as follows:

At the cathode

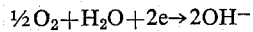

At the anode

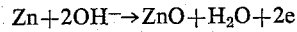

Total cell reaction

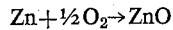

When the zinc anode is completely or substantially completely oxidized to the oxide, the anode is replaced by loosening suitable retaining means on the battery, removing the anode and inserting a new anode. Since the cathode remains unchanged as a result of the electrochemical reaction, it does not require a separate charging step. Preferably, new electrolyte will be furnished to the cell at the time the anode is replaced, for example, by saturating the porous anode and/or a hydrophilic membrane or matrix around the anode.

Although the aforesaid batteries are exceptional, one area permitting improvement is the more rapid replacement of the anodes in field operation. Preferably, a 60-watt 32-volt battery should be capable of being reactivated, i.e., the consumed anodes removed and new anodes inserted, in no more than about ten minutes. Therefore, it is desirable to have as few replaceable components in a cell as necessary. However, in order to fulfill the voltage and current density requirements, it is necessary that the anode and cathode units be constructed in relatively small units rather than in large unitary designs. More specifically, a 28-cell battery (operating at a nominal 1.2 volts per cell) would consist of 28 separate bi-cells, each bi-cell consisting of 2 cathodes connected in parallel and capable of accommodating a single anode recharge. Each cell would then deliver its nominal voltage and the net voltage for the battery would be 32 volts. Following discharge of the battery, it would be necessary to remove 28 discharged anodes and to replace these with 28 new anode charges, thereby requiring a total of 56 individual actions to recharge or reactivate the battery.

Accordingly, it is an object of the present invention to provide air or oxygen depolarized electrochemical units having replaceable modular anodes permitting rapid and convenient replacement.

It is another object of the invention to provide air or oxygen depolarized electrochemical units comprising an envelope cathode and a modular anode for insertion in said cathode.

It is another object of the invention to provide air or oxygen depolarized electrochemical units comprising an envelope cathode, an electrolyte and a split, porous modular anode permitting more rapid reactivation.

These and other objects of the invention will become more readily apparent from the following detailed description, with particular emphasis being placed upon the drawing.

The aforesaid objects of the invention are accomplished by utilizing a modular cell construction and modular cell construction and modular anode recharges in the construction of a metal/air or metal/oxygen depolarized electrochemical unit comprising an envelope cathode, an anode, and an electrolyte separating the anode and cathode. By employing the aforesaid design, the number of individual actions needed to recharge or reactivate a battery can be reduced by one half or more. According to the present invention, the envelope cathode will comprise four cathodes capable of forming two separate bi-cells, i.e., two cathodes in each cell connected in parallel and insulated from the next cell, or four individual cells with one cathode being available for each cell. The anode recharge comprises two anodes having a common non-conductive top portion. Further, according to the present invention, each anode can be bi-sected with an insulating material, thereby converting the aforementioned two-cell anode into a four-cell anode. By providing as much anodic material on each side of the insulator as was previously present in the anodes described, it is possible to deliver the same capacity of current at a higher voltage by proper series connection. In effect, the number of anode replacements required in the 12-volt battery is reduced from 12 to six or three, depending upon which embodiment is employed. As apparent, therefore, the number of individual actions and, thus, the time necessary to recharge or reactivate a battery in the field is substantially reduced.

The improved modular construction of the electrochemical units of the present invention will be more readily apparent from the accompanying drawing wherein like numerals are employed to designate like parts and wherein FIGURE 1 is an exploded perspective view of one embodiment of the improved cell and FIGURE 2 is a perspective view of a second embodiment of the improved cell, with the anode being partly broken away.

More specifically, referring to FIGURE 1 of the drawing, reference numeral 1 is directed to the complete modular anode comprising an integral non-conducting top 1.1 and two individual anodes 1.4. Handles 1.3 are provided for the convenient replacement of the modular anode. Envelope cathode 2 comprises a frame 2.1, a hydrophobic membrane 2.2, and a conductive support screen 2.4 which is on the internal side of the membrane but in view of the thinness of the membrane the configuration of the screen is apparent from the outer surface of the membrane. The envelope cathode is separated into two parts by means of insulating member 2.3. The modular anode of the electrochemical unit fits into the envelope cathode 2 and is held in place by suitable retaining means not shown. Preferably, a glassine paper, fiber reinforced cellulose, or the like, completely covers the anode and electrically insulates the anode from the bi-cathode. If the anode is porous, sufficient electrolyte can be retained in the anode and anode wrap to fulfill the needs of the cell. In the event a sheet metal anode is selected, the electrolyte can be added to the pocket of the bi-cathode and allowed to saturate the anode wrap after the anode is in place or the anode wrap can be saturated with electrolyte prior to insertion of the anode. Anode lead 1.2 is connected to an adjacent cathode lead 2.5 by means of a suitable socket, not shown.

FIGURE 2, which is an exploded view partly in section of a second embodiment of the modular construction, illustrates a unit wherein the anode has been bi-sected with insulating material 1.5. As is apparent from the drawing, the thickness of the total anode has been increased as has been the thickness of the envelope cathode. Thus, insulating member 1.5 extends throughout the anode and electrically separates the two surfaces of the anode from each other. The insulating member extends beyond the outer surfaces of the anode to form a ridge, which ridge fits into slot 2.6 of the envelope cathode to provide a fluid-tight tongue and groove association. It may be desirable to include a support frame 1.6 around the anode to preserve its mechanical integrity. Although it is preferred that the insulating member 1.5 and support frame 1.6, if employed, be constructed as an integral unit, it is possible to construct them as individual components and thereafter assemble the entrie modular anode. It is essential, however, that the seal between the faces of the envelope cathode and the separate portions of the bi-sected anode be fluid-tight to prevent electrolyte seepage from one compartment to the other compartment. For this reason, it may be desirable to employ seals, not shown, to ensure fluid-tightness.

The insulating materials which are employed in fabricating the envelope cathode frame, the anode frame, and the battery top can be any insulating material which is capable of withstanding the environment of use. Thermosetting and thermo-plastic epoxy resins such as those obtained from the condensation reaction of bisphenol A [2,2-bis(4-hydroxyphenyl) propane] and epichlorohydrin are particularly suitable. However, other resins can be employed such as the phenol-formaldehyde and urea-formaldehyde thermo-plastic or thermo-setting resins. Such materials are readily available and known, to one skilled in the art.

The bi-cathode as more fully described in the aforesaid co-pending Oswin application Ser. No. 427,623 comprises a hydrophobic membrane which is in contact with a conductive metal support screen or mesh and a catalytic layer. The membrane which is to be used can be any material which is hydrophobic and permits the passage of gas, but precludes the flow of aqueous materials. Exemplary materials are the polymers of fluorinated hydrocarbons such as polytetrafluoroethylene, polytrifluoroethylene, polyvinylfluoride, polyvinylidenefluoride, polytrifluoroethylene, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns, and a thickness of about 0.5 to 10 mils. The catalysts used to coat the hydrophobic polymers are the pure elements, alloys, oxides, or mixtures thereof which are effective in promoting an electrochemical reaction. More specifically, operable materials include the elements, alloys, oxides, or mixtures of Group I-B, II-B, IV, V, VI, VII, and VIII metals of the Mendelyeev's Periodic Table. The metal support screen can be any material which conducts an electrical current and which will withstand the corrosive environment of the battery. Such materials include nickel, zirconium, titanium, and tungsten screens, expanded meshes or the like. Moreover, it is possible to apply a hydrophilic polymer or other suitable hydrophilic material such as paper, over the catalytic layer which will be in contact with the electrolyte of the battery when in operation.

The anodes which are to be used herein can be any conventional solid electro-conductor employed in a metal/ air or metal/oxygen cell such as metals, metalloids, alloys, and the heavy metal salts. It is only essential that the material selected by chemically reactive with a compatible electrolyte and be more electro-positive than oxygen. Such materials include lead, zinc, iron, cadmium, aluminum, and magnesium. From the standpoint of cost, capacity, and convenience, zinc is the preferred material. Although the anode can be in the form of a solid, or substantially solid metal sheet, it is preferred that the anode be porous. Porous anodes can be made, for example, by sintering select metal powders.

The cells will operate on conventional electrolytes including the alkaline materials such as sodium hydroxide, potassium hydroxide, mixtures of potassium and rubidium hydroxide and the like. Acid electrolytes including sulfuric acid, phosphoric acid, and hydrochloric acid can be employed. As is apparent, depending upon the particular electrolyte used, different anode materials can be selected. It is also feasible, and at times desirable, to employ an electrolyte which is trapped in a suitable matrix such as those made up of hydrophilic polymers, ceramic materials, and the like.

It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. An improved metal/or or metal/oxygen electrochemical unit comprising an envelope cathode comprising a hydrophobic membrane and a conductive catalytic coating on the inner surface of said membrane, a replaceable modular anode positioned within said cathode, an electrolyte between the anode and cathode, said cathode comprising at least 4 individual surfaces, at least two of said surfaces being electrically insulated from the second two surfaces, and said modular anode comprising two anode units integral with a common non-conductive top portion, and means for retaining said cathode, anode, and electrolyte in operable association.

2. The improved electrochemical unit of claim 1 wherein the anode is porous zinc and the hydrophobic membrane is polytetrafluoroethylene.

3. The improved electrochemical unit of claim 1 wherein the four individual surfaces of said cathode are each electrically insulated from the other, and the two anode units of said modular anode are bi-sected with an insulating member forming four individual anode surfaces, said four anode surfaces being electrically separated from each other.

4. The improved electrochemical unit of claim 3 wherein the four anode surfaces are electrically separated from each other by means of an associated tongue and groove in said modular anode and envelope cathode.

5. The improved electrochemical unit of claim 2 wherein the electrolyte is trapped in a matrix.

6. The improved electrochemical unit of claim 3 wherein the electrolyte is trapped in a matrix.

7. The improved electrochemical unit of claim 6 wherein the matrix is integral with the cathode.

8. The improved electrochemical unit of claim 6 wherein the matrix is integral with the anode surfaces.

9. The improved electrochemical unit of claim 1 wherein said cathode comprises a hydrophobic polymer membrane adjacent a conductive metal screen and the conductive catalytic coating is rolled into said screen.

10. The improved electrochemical unit of claim 9 wherein the catalytic coating is an admixture of metal black and colloidal polytetrafluoroethylene.

References Cited

UNITED STATES PATENTS

| | | | |
|---|---|---|---|
| 744,989 | 11/1903 | Winters | 136—102.12 |
| 3,378,406 | 4/1968 | Rosansky. | |

WINSTON A. DOUGLAS, Primary Examiner

D. L. WALTON, Assistant Examiner

U.S. Cl. X.R.

136—166

FO-1050
(5/69)

UNITED STATES PATENT OFFICE
CERTIFICATE OF CORRECTION

Patent No. 3,479,225  Dated November 18, 1970

Inventor(s) Stewart M. Chodosh and Emanuel G. Katsoulis

It is certified that error appears in the above-identified patent and that said Letters Patent are hereby corrected as shown below:

Column 2, lines 44 and 45, delete "and modular cell construction";

Column 3, line 52, delete "entrie" and insert -- entire --;

Column 4, line 32, delete "by" and insert -- be --;

Column 4, line 59, delete "metal/or" and insert -- metal/air --.

SIGNED AND
SEALED
NOV 17 1970

(SEAL)
Attest:

Edward M. Fletcher, Jr.
Attesting Officer

WILLIAM E. SCHUYLER, JR.
Commissioner of Patents